(12) United States Patent
Takeuchi (10) Patent No.: US 7,729,048 B2
(45) Date of Patent: Jun. 1, 2010

(54) MICROSCOPE SYSTEM

(75) Inventor: Atsushi Takeuchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 151 days.

(21) Appl. No.: 11/664,277

(22) PCT Filed: Oct. 7, 2005

(86) PCT No.: PCT/JP2005/018630

§ 371 (c)(1),
(2), (4) Date: Mar. 30, 2007

(87) PCT Pub. No.: WO2006/041029

PCT Pub. Date: Apr. 20, 2006

(65) Prior Publication Data

US 2007/0268573 A1        Nov. 22, 2007

(30) Foreign Application Priority Data

Oct. 8, 2004   (JP)   .............................. 2004-296042
Dec. 22, 2004   (JP)   .............................. 2004-370929

(51) Int. Cl.
*G02B 21/00* (2006.01)
(52) U.S. Cl. ...................................... 359/383; 359/379
(58) Field of Classification Search ...................... None
See application file for complete search history.

(56) References Cited

U.S. PATENT DOCUMENTS 4,168,881 A * 9/1979 Rosenberger ................ 359/381
5,270,855 A * 12/1993 Hasegawa .................... 359/368
6,128,129 A * 10/2000 Yoneyama .................... 359/383
2002/0176161 A1  11/2002 Yoneyama et al.
2006/0139747 A1 * 6/2006 Dietzsch et al. ............. 359/368

FOREIGN PATENT DOCUMENTS

| JP | 06-003596 A | 1/1994 |
| JP | 06-051204 A | 2/1994 |
| JP | 06051204 A * | 2/1994 |
| JP | 06-050018 U | 7/1994 |
| JP | A 06-186469 | 7/1994 |
| JP | B2 2 3067802 | 5/2000 |
| JP | A 2003-279831 | 10/2003 |
| JP | 2004-226882 A | 8/2004 |
| WO | WO 94/07163 A1 | 3/1994 |
| WO | WO 2004/059362 A1 | 7/2004 |

OTHER PUBLICATIONS

English-language translation of Japanese Office Action mailed Dec. 8, 2009, in Japanese Application No. 2004-370929.
English-language translation of Japanese Office Action mailed Dec. 1, 2009, in Japanese Application No. 2004-296042.

* cited by examiner

*Primary Examiner*—Lee Fineman
(74) *Attorney, Agent, or Firm*—Oliff & Berridge, PLC (57) ABSTRACT

A microscope system includes a stand unit provided with a up/down drive unit for an objective lens, and a base unit provided with a up/down drive unit for a X-Y stage. When the stand unit and the base unit are fixed to each other, a displacement range of the objective lens drive unit along the up/down direction and a displacement range of the stage drive unit along the up/down direction are different from each other.

8 Claims, 11 Drawing Sheets

MICROSCOPE SYSTEM

TECHNICAL FIELD

The present invention relates to a microscope system.

BACKGROUND ART

Either the objective lens or the stage is driven in order to adjust focus on a specimen surface in a microscope system in the related art (see patent reference literature 1). The drive stroke is determined in correspondence to the size of the microscope or the length of the guide unit and a specimen that is larger than the stroke cannot be observed. Observation of a specimen with a height measuring more than the stroke is enabled in the related art by adopting a structure that allows the mounting position of a sub-stage used to hold the stage, to be adjusted along the Z axis (up/down direction) or by inserting a raising adapter or the like between the stage and the objective lens (over an area of the stand of the microscope in many cases).

Patent Reference Literature 1: Japanese Laid Open Patent Publication No. H6-186469

DISCLOSURE OF THE INVENTION

Problems to be Solved by the Invention

However, each time a specimen larger than the microscope stroke is set on the stage, the sub-stage must be adjusted to the optimal position or the optimal raising adapter must be inserted in correspondence to the particular specimen. For this reason, the operations that must be performed when observing specimens with varying thicknesses over a wide thickness range, are extremely complicated.

Means for Solving the Problems

A unit-type microscope system according to the present invention includes a stand unit provided with a up/down drive unit for an objective lens, and a base unit provided with a up/down drive unit for a X-Y stage, wherein when the stand unit and the base unit are fixed to each other, a displacement range of the objective lens drive unit along the up/down direction and a displacement range of the stage drive unit along the up/down direction are different from each other. According to the present invention, it is possible to ensure a up/down stroke which is wide enough to observe a specimen with a large thickness as well as a specimen with a small thickness so that operability for changing specimens is improved and observation is performed smoothly.

It is to be noted that a holding device that holds an objective lens, a stage device that holds a specimen, a first drive device, a second drive device, and a control device that controls drive of an electric motor may be replaced with a holding means, a stage means, a first device means, a second drive means and a control means, respectively.

BEST MODE FOR CARRYING OUT THE INVENTION

First Embodiment

Figure 1:
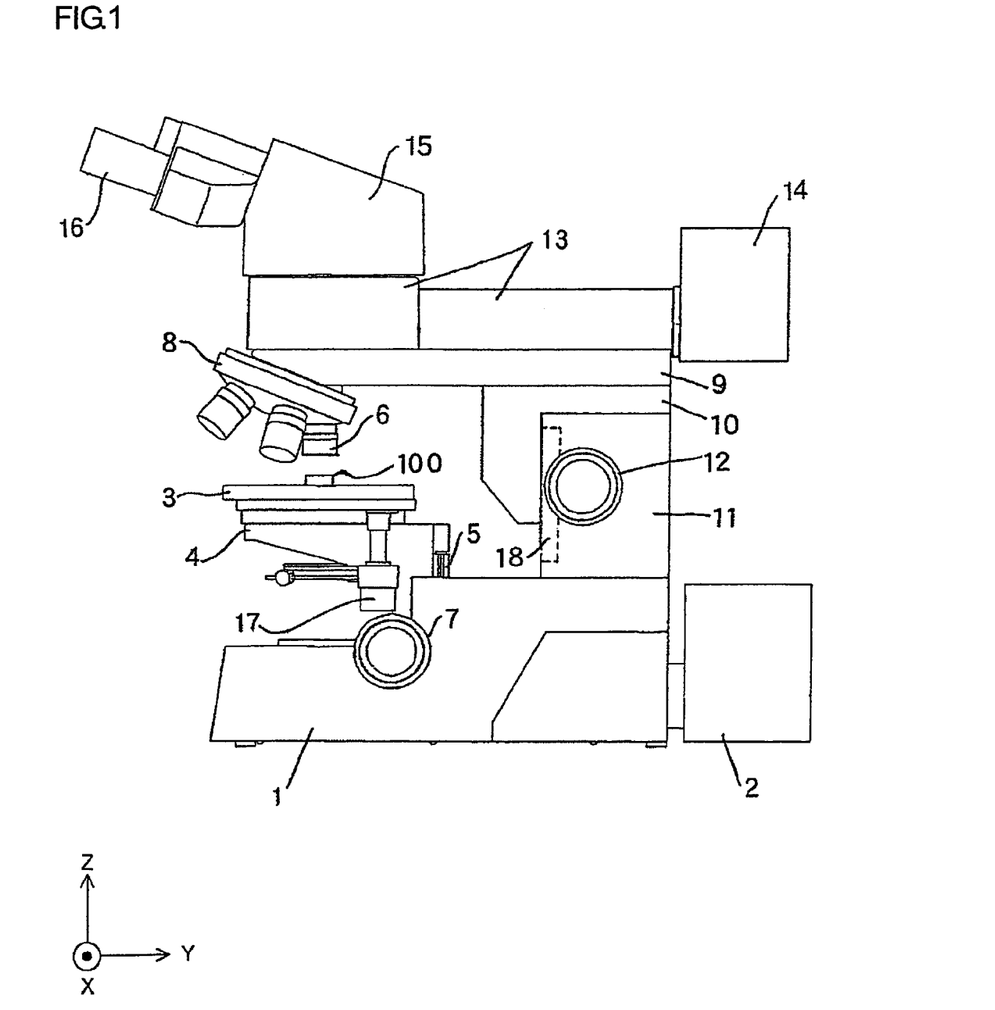
FIG. 1 shows a first embodiment of the microscope system according to the present invention.

FIG. 1 shows the first embodiment of the microscope system according to the present invention, viewed from a side. It is assumed that the X axis extends perpendicular to the drawing sheet, that the Y axis extends horizontally on the drawing sheet and that the Z axis extends vertically on the drawing sheet. A lamp house 2 used for transmitted illumination is connected to a base unit 1. Light originating from the lamp house 2 to be used for transmitted illumination travels through a transmitted illumination system (not shown) installed within the base unit 1 and illuminates a specimen (sample) 100 from below.

The specimen 100 is placed on a stage 3 and as the stage 3 is moved along the X-Y directions, the specimen 100, too, moves along the X-Y directions. The stage 3 is mounted at a sub-stage 4 so as to be allowed to move along the X and Y directions. The sub-stage 4 is held via a first Z drive mechanism 5 so as to be allowed to move along the Z axis (the top/bottom direction with respect to the microscope) relative to the base unit 1. Thus, the stage 3 is allowed to move along the Z direction as well. This structure allows the specimen 100 to move along the Z axis relative to an objective lens 6 for focus adjustment.

The stage 3 is driven along the X-Y directions via an X-Y drive mechanism 17. A user (the person observing the specimen through the microscope) operates the first Z drive mechanism 5 by manually rotating a first vertical motion handle 7 so as to move the stage 3 up or down and also operates the X-Y drive mechanism 17 to move the stage 3 to the left or the right and forward or back.

A plurality of objective lenses 6 with varying powers of magnification are mounted at a nosepiece 8 so as to allow a given specimen to be observed at a desired magnifying power. The nosepiece 8, mounted at an arm portion 9, is held at a stand unit 11 via a bracket portion 10 so as to be allowed to move up/down. The bracket portion 10 is mounted at the stand unit 11 via a second Z drive mechanism 18. The bracket portion 10 holding the arm portion 9 is able to move along the Z axis (up/down) relative to the stand unit 11 via the second Z drive mechanism 18.

The user operates the second Z drive mechanism 18 by manually rotating a second vertical motion handle 12 so as to move the bracket portion 10, the arm portion 9 and the nosepiece 8 up/down and thus is able to move the objective lens 6 along the Z axis relative to the specimen.

As described above, the microscope system achieved in the embodiment includes two Z axis elevator mechanisms, i.e., the first Z drive mechanism 5 disposed between the sub-stage 4 and the base unit 1 and the second Z drive mechanism 18 disposed between the bracket portion 10 and the stand unit 11. It is to be noted that guide units convert the rotational motion of the vertical motion handles 7 and 12 to linear motion via mechanisms such as rack-and-pinion gears so that the objective lens 6 and the stage 3 are caused to move up/down.

In the microscope system achieved in the embodiment the range over which the stage 3 can move along the Z axis (up/down) by rotating the first vertical motion handle 7 and the range over which the objective lens 6 can move along the Z axis (up/down) by rotating the second vertical motion handle 12 are set so as not to overlap each other. Namely, the drive range of the stage 3, driven by the first vertical motion handle 7 and the corresponding drive mechanism 5 along the Z axis (up/down) and the drive range of the objective lens 6 driven by the second vertical motion handle 12 and the corresponding drive mechanism 18 along the Z axis (up/down), are different.

An epi-illumination device 13 holding a lamp house 14 used for epi-illumination is mounted at the arm portion 9 so as to illuminate the specimen 100 from above. A lens barrel 15 is mounted on top of the epi-illumination device 13 so as to enable the user to observe an enlarged image of the specimen via an eyepiece lens 16 mounted at the lens barrel 15.

The following operational effects can be achieved in the microscope system in the first embodiment structured as described above.

(1) The microscope system achieved in the embodiment includes two Z drive mechanisms, i.e., the first Z drive mechanism 5 disposed between the sub stage 4 and the base unit 1 and the second Z drive mechanism 18 disposed between the bracket portion 10 and the stand unit 11. Thus, the overall stroke achieved in the microscope is the combination of the strokes of the two guide units. In other words, assuming that a stroke matching the stroke of a microscope in the related art is achieved via each of the two guide units, the continuous observation range is double the length of the stroke of microscope in the related art, making it possible to observe various types of specimens from a thin specimen to the thick specimen, through a simple operation.

(2) To elaborate on the point made above, since the stage 3 and the objective lens 6 can both be driven along the Z axis (up/down) over drive ranges different from each other, a space as large as that combining the stroke of the stage 3 and the stroke of the objective lens 6 can be set between the stage 3 and the objective lens 6 if necessary. As a result, focus can be adjusted on the specimen 100, whether it has a small thickness or a large thickness, simply by rotating the first vertical motion handle 7 and the second vertical motion handle 12. Namely, unlike the microscope in the related art, the microscope system does not require any complicated operations such as re-mounting the sub-stage at the optimal position for the particular specimen 100 or inserting/removing a raising adapter, each time specimens 100 are switched.

(3) When adjusting focus on the specimen 100, the user is allowed to choose whether the stage 3 is to be driven up/down or the objective lens 6 is to be driven up/down. If probes or various types of measuring devices are mounted at the specimen 100, it is more convenient to move the objective lens 6 up/down. If, on the other hand, the user wishes to hold his eye at a steady position (the position of the observing eye) so as to minimize fatigue, the stage can be moved up/down. In other words, the member to be driven for focus adjustment can be selected in correspondence to the specific observation environment.

It is to be noted that while an explanation is given above in reference to the embodiment on an example in which the present invention is adopted in a structure in which the lens barrel 15 and the objective lens 16, too, move up/down as the objective lens 6 is driven up/down, the present invention is not limited to this example. It may be adopted in a structure with the epi-illumination device 13 fixed onto the stand unit 11, in which the objective lens 6 and the nosepiece 8 alone move up/down as the vertical motion handle 12 is rotated. This structure, too, allows the observing eye to be held at a steady position.

In the embodiment described above, the drive range over which the stage 3 is driven along the Z axis (up/down) via the first vertical motion handle 7 and the corresponding drive mechanism and the drive range over which the objective lens 6 is driven along the Z axis (up/down) via the second vertical motion handle 12 and the corresponding drive mechanism are different from each other and thus do not overlap. However, the present invention is not limited to this example and these ranges may partially overlap. It is to be noted, however, that these drive ranges must always include portions that do not overlap each other and that they do not overlap each other over as wide a range as possible.

Second Embodiment

Figure 2:
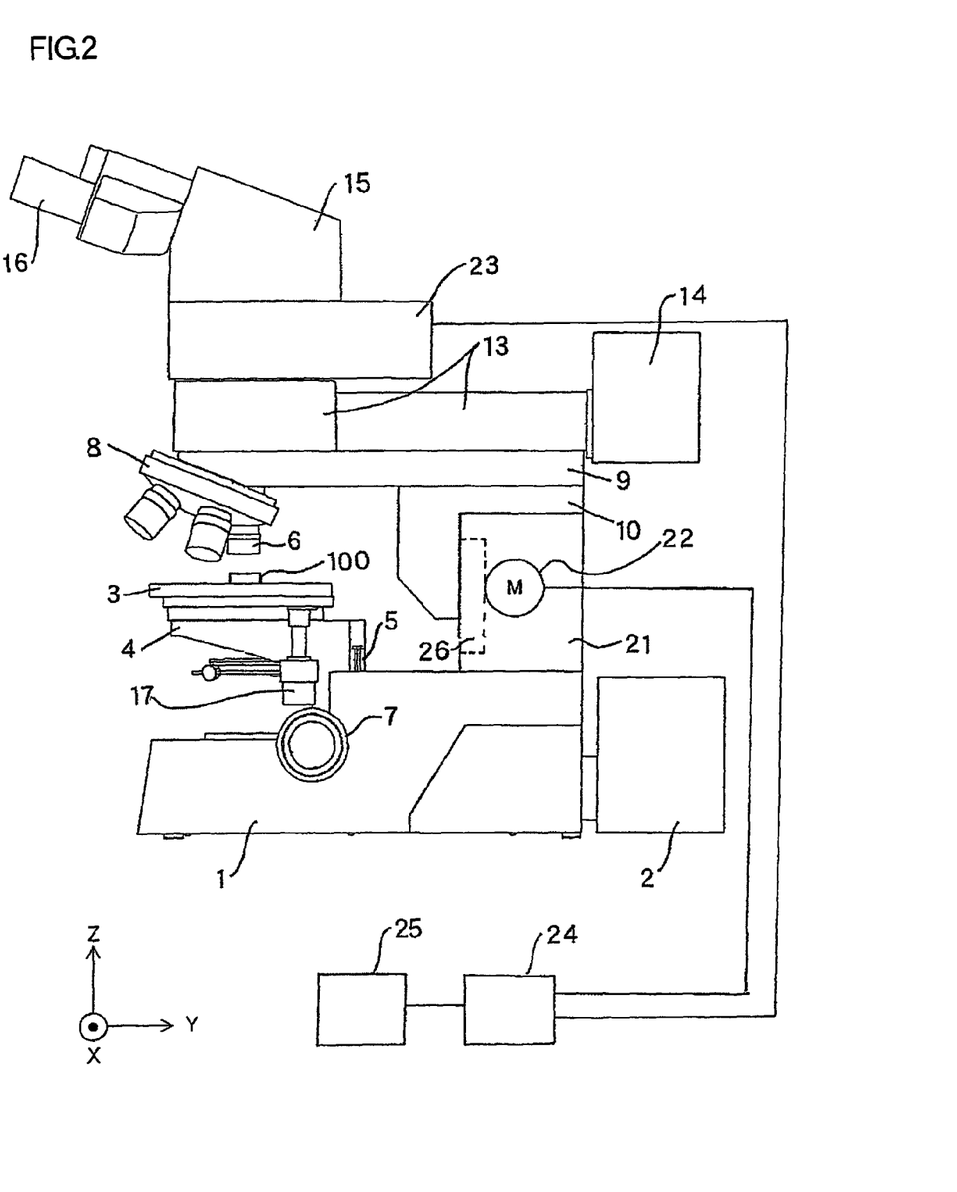
FIG. 2 shows a second embodiment of the microscope system according to the present invention.

FIG. 2 shows the second embodiment of the microscope system according to the present invention. The same reference numerals are assigned to components similar to those of the microscope system achieved in the first embodiment to preclude the necessity for a detailed explanation thereof. The microscope system achieved in the second embodiment includes an electrically driven vertical motion unit in place of the second vertical motion handle 12 used in the first embodiment, which is operated manually. The following explanation focuses on differences from the first embodiment.

A motor 22 that causes the bracket portion 10, the arm portion 9, the nosepiece 8 and the objective lens 6 to move up/down is built into an electrically driven stand unit 21. An AF unit 23 is mounted atop the epi-illumination device 13. In addition, a switchbox 25 is installed externally. The motor 22 and the AF unit 23, both connected to a controller (control device) 24, are controlled by the controller 24. The controller 24, constituted with a microcomputer and its peripheral circuits, controls the overall operations in the microscope system by executing a specific program. The controller 24 includes a drive circuit for the motor 22. While the controller 24 is disposed outside the microscope system in the illustration provided in FIG. 2, the controller 24 may instead be installed inside the base unit 1 or the electrically driven stand unit 21.

Via the switchbox 25 at which an AF switch (not shown), a vertical motion switch (not shown) for moving up/down the objective lens and the like are disposed, instructions for various types of control can be issued to the controller 24 in response to operations performed by the user at the switchbox 25. For instance, in response to an operation of the AF switch by the user, a corresponding operation signal is transmitted from the switchbox 25 to the controller 24, which then executes AF (autofocus) control. In response to an operation of the objective lens vertical motion switch performed by the user, a corresponding operation signal is transmitted from the switchbox 25 to the controller 24, which then causes the objective lens to move by controlling the motor 22.

The AF unit 23 includes a built-in imaging device constituted with a CCD or the like (not shown) and transmits focus information to the controller 24. Based upon the focus information transmitted from the AF unit 23, the controller 24 executes AF control for the microscope system by controlling the rotation direction of the motor 22, the rotation itself and the timing with which the rotation stops. Namely, the controller 24 executes control so as to automatically adjust focus on the specimen 100.

The drive force imparted from the motor 22 is transmitted to a third Z drive mechanism 26 similar to those achieved in the first embodiment via a gear achieving a specific speed reducing ratio. As the third Z drive mechanism 26 constituted with a rack-and-pinion mechanism or the like converts the rotating motion of the motor 22 to a linear motion, the bracket portion 10 is driven up/down with the third Z drive mechanism 26. It is to be noted that since the objective lens is driven by the motor 22 mainly for purposes of AF control, a specific type of speed reducing gear or the like is selected to ensure that the objective lens can driven with very fine control.

Figure 3:
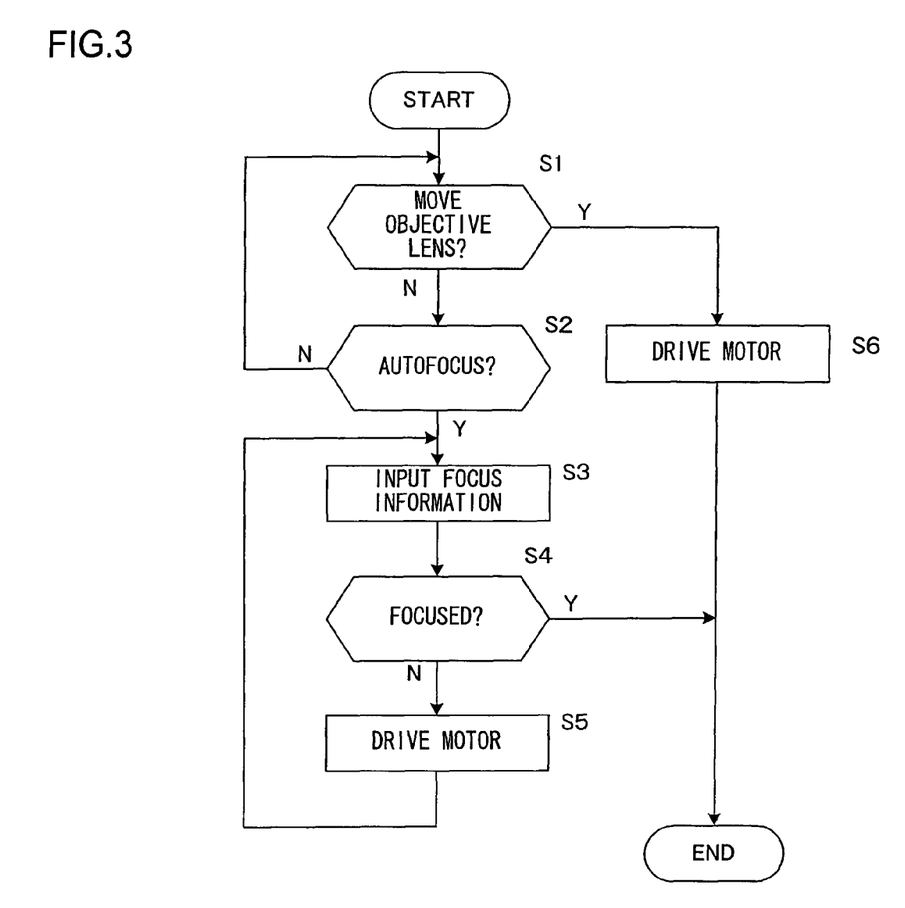
FIG. 3 presents a flowchart of the AF control and the objective lens displacement control executed by a controller by driving a motor.

FIG. 3 presents a flowchart of the AF control and the objective lens displacement control executed by the controller 24 by driving the motor 22. In step S1, a decision is made as to whether or not the objective lens vertical motion switch at the switchbox 25 has been operated. If it is decided in step S1 that the objective lens vertical motion switch has been operated, the operation proceeds to step S6, whereas if it is decided in step S1 that the objective lens vertical motion switch has not been operated, the operation proceeds to step S2.

In step S2, a decision is made as to whether or not the AF switch at the switchbox 25 has been operated. If it is decided in step S2 that the objective lens AF switch has been operated, the operation proceeds to step S3, whereas if it is decided in step S2 that the AF switch has not been operated, the operation returns to step S1 to repeatedly execute the processing described above.

In step S3, the focus information (focus signal) provided by the AF unit 23 is input. The focus information may indicate, for instance, the contrast value of the specimen image. In step S4, a decision is made based upon the focus information as to whether or not focus has been adjusted, i.e., whether or not a focus match has been achieved. For instance, it may be decided that focus has been adjusted (a focus match has been achieved) if a peak contrast value is indicated.

If it is decided in step S4 that focus has been adjusted, the processing ends. However, if it is decided in step S4 that focus has not been adjusted, the operation proceeds to step S5. In step S5, the motor 22 is driven to move the objective lens by a very small amount. The direction in which the motor 22 is to rotate is determined based upon the direction in which it rotated previously and also based upon the focus information. Subsequently, the operation returns to step S3 to repeatedly execute the processing described above.

In step S6, the motor 22 is driven to move the objective lens 6. At the objective lens vertical motion switch, an upward motion and a downward motion can be specified as distinct from each other and the objective lens is made to move up/down based upon an operation signal from the vertical motion switch. In addition, while the explanation is given by assuming that the objective lens is made to move to an end of its movement range in response to depression of the switch, an alternative structure in which it is caused to move only while the switch is held down may be adopted. Subsequently, the processing ends.

In addition to the operational effects of the microscope system in the first embodiment, the microscope system in the second embodiment structured as described above can achieve the following operational effects.

(1) The focus adjustment is achieved entirely by moving the objective lens driven via the motor 22, and when the stage 3 needs to be lowered by a large extent, e.g., when replacing the specimen 100, the stage 3 can be moved by a large amount through a manual operation performed by the user. As a result, the operability of the microscope system is improved greatly.

It is to be noted that while an explanation is given above in reference to the embodiment on an example in which the present invention is adopted in a structure that includes an electrically driven vertical motion unit provided in place of the second vertical motion handle 12, the present invention is not limited to this example. The first vertical motion handle 7, instead of the second vertical motion handle 12, may be replaced with an electrically driven vertical motion unit. Alternatively, the first vertical motion handle 7 and the second vertical motion handle 12 may both be replaced with electrically driven vertical motion units. While the improvement in the operability through the combination of manual operation and electric motor operation described above is not achieved in the latter case, advantages similar to those explained in reference to the first embodiment can be achieved in a microscope system in which the stage and the objective lens are electrically driven.

Third Embodiment

Figure 4:
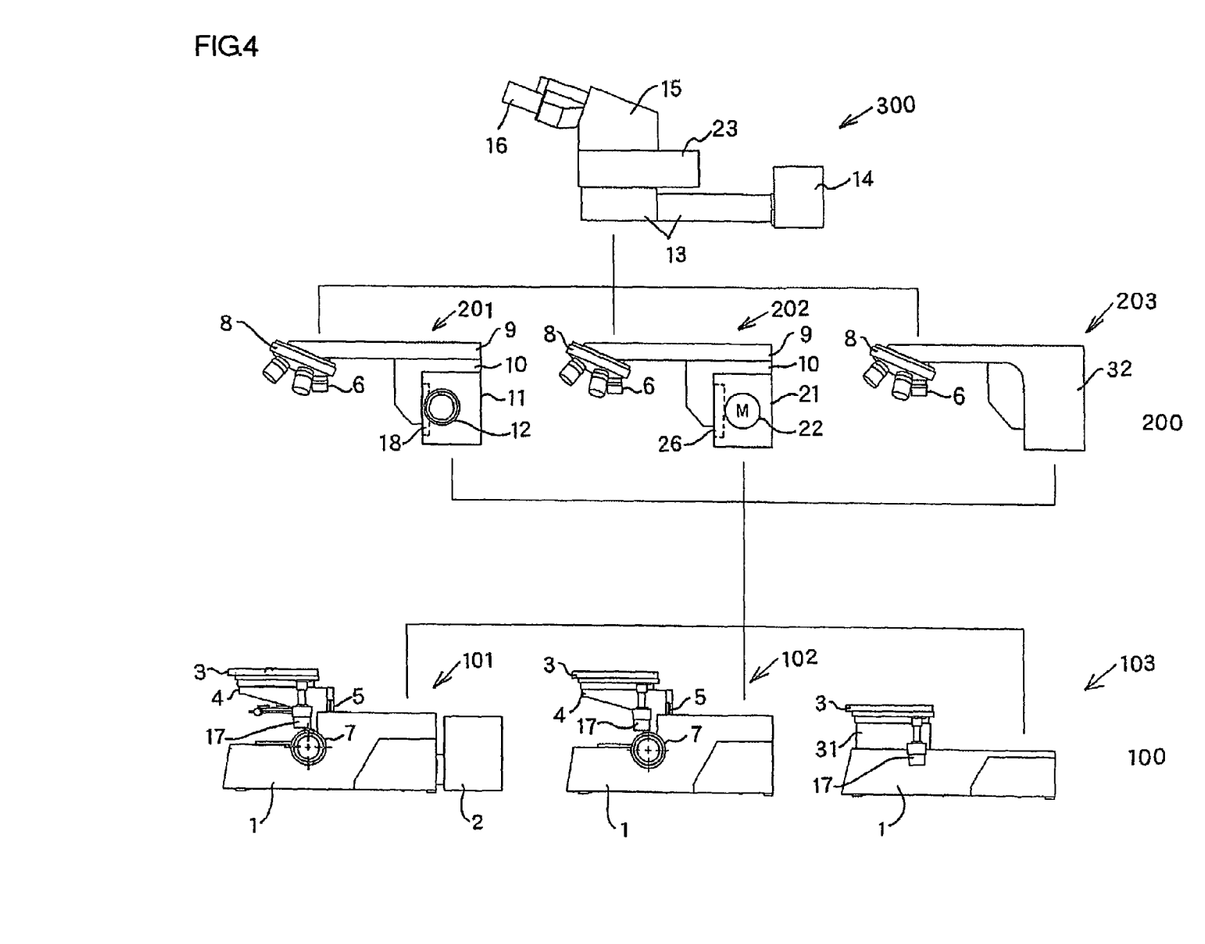
FIG. 4 shows a system diagram of the microscope system achieved in a third embodiment of the present invention.

FIG. 4 is a system diagram of the microscope system achieved in the third embodiment of the present invention. The microscope system in the third embodiment includes three units independent of one another, i.e., a base unit 100, a stand unit 200 and an eyepiece unit 300, each of which can be mounted/dismounted independently. In addition, the base unit 100 and the stand unit 200 each include a plurality of variation units and thus, the base unit and the stand unit can be utilized in any of various combinations of the individual variation units. As a result, simply by utilizing specific variation units in combination, a microscope system similar to that achieved in the first embodiment and a microscope system similar to that in the second embodiment can be provided with ease. It is to be noted that the same reference numerals are assigned to components similar to those in the microscope systems achieved in the first embodiment and the second embodiment to preclude the necessity for a detailed explanation thereof.

A structure similar to that in the first embodiment is adopted in a base unit 101, which is constituted with a base unit 1, a lamp house 2 for transmitted illumination, a transmitted illumination system (not shown), a stage 3, a sub-stage 4, a first Z drive mechanism 5, a first vertical motion handle 7, an X-Y drive mechanism 17 and the like. A base unit 102 is similar to the base unit 101 except that the base unit 102 is not equipped with a lamp house 2 for transmitted illumination or a transmitted illumination system (not shown). A base unit 103 is constituted with a stage 3, a sub-stage 31, an X-Y drive mechanism 17 and a base unit 1. Unlike the sub-stage 4, the sub-stage 31 is fixed onto the base unit 1. In other words, the stage 3 in the base unit 103 cannot move up/down.

A structure similar to that in the first embodiment is adopted in a stand unit 201, which is constituted with an objective lens 6, a nosepiece 8, an arm portion 9, a bracket portion 10, a stand unit 11, a second Z drive mechanism 18, a second vertical motion handle 12 and the like. A structure similar to that in the second embodiment is adopted in a stand unit 202, which includes an electrically driven vertical motion unit provided in place of the second vertical motion handle 12 in the stand unit 201, an electrically driven stand unit 21, a motor 22, a third Z drive mechanism 26 and the like. In addition, although not included in the illustration presented in FIG. 4, the stand unit 202 includes a controller 24 and a switchbox 25 as well. A stand unit 203 is constituted with an objective lens 6, a nosepiece 8, an arm stand unit 32 and the like. The arm stand unit 32 is an integrated unit that combines an arm portion and a stand unit and the arm portion of the arm stand unit 32 is not a movable member. In other words, the objective lens 6 in the stand unit 203 is not allowed to move up/down.

The eyepiece unit 300 is constituted with a lamp house 14 for epi-illumination, an epi-illumination device 13, a lens barrel 15, an eyepiece lens 16 and an AF unit 23. It is to be noted that the lamp house 14 for epi-illumination, the epi-illumination device 13 and the AF unit 23 can be detached whenever necessary in conjunction with a specific combination of the base unit and the stand unit in use.

By utilizing specific units to constitute the microscope system in various combinations, the versatility of the microscope system is greatly broadened. For instance, by using the base unit 101, the stand unit 201 and the eyepiece unit 300 minus the AF unit 23 in combination, a microscope system similar to that achieved in the first embodiment is configured. By using the base unit 101, the stand unit 202 and the eyepiece unit 300 mounted in combination with the AF unit 23, a microscope system similar to that achieved in the second embodiment is configured. Furthermore, by using the base unit 101, the stand unit 203 and the eyepiece unit 300 in combination minus the AF unit 23, a standard microscope system that allows the stage alone to be driven manually along the X, Y and Z directions can be configured.

It is to be noted that individual units are connected with one another via coupling members such as screws or nuts and bolts (not shown). In addition, positioning mechanisms such as contact surfaces or positioning pins are provided at the base unit 1, the stand unit 11, the electrically driven stand unit 21 and the arm stand unit 32 to assure accurate positioning and, as a result, each unit can be mounted at the correct position with ease and accuracy.

Furthermore, when mounting the epi-illumination device 13 at an arm portion 9 or the arm stand unit 32, the epi-illumination device 13 is positioned and fixed in reference to a reference mark. However, when the base unit 101, which includes the transmitted illumination system, is used, the epi-illumination device does not always need to be mounted. Under such circumstances, the lamp house 14 for epi-illumination and the epi-illumination device 13 may be excluded from the eyepiece unit 300.

As explained earlier in the second embodiment, it is desirable to utilize the eyepiece unit 300 mounted with the AF unit 23 in combination with the stand unit 202 which is electrically driven by the motor 22.

The following operational effects are achieved in the third embodiment, which allows various microscopes to be configured through combinations of specific units as described above.

(1) By utilizing specific units to configure the microscope systems in various combinations, the versatility of the microscope system is greatly broadened. Thus, a microscope system that satisfies the user's preference can be provided with ease and at low cost. In addition, it provides the user with more options.

(2) In particular, by utilizing various units as universal units, the microscope systems in the first embodiment and the second embodiment can be achieved with ease. Moreover, the microscope system in the first embodiment can be reconfigured to the microscope system in the second embodiment or vice versa, and the configuration of another microscope system can be achieved with ease and at low cost.

It is to be noted that while the third embodiment does not include a base unit with an electrically driven first vertical motion handle 7, such a base unit may also be provided as a variation.

In the description of the embodiment, the term "unit" is used to refer to each part unit. Alternatively, the term "component" may be used to refer to such a part unit. Either of these terms may be used to refer to a unit that is physically independent of the other units and can be manufactured, packaged, transported and the like independently. These units can be combined in specific configurations to achieve various microscope systems.

Fourth Embodiment

The fourth embodiment of the present invention is explained below.

In reference to the fourth embodiment, a method that may be adopted to lock the individual units to one another by accurately positioning them when the microscope system is constituted with the base unit 100, the stand unit 200 and the eyepiece unit 300 provided as units independent of one another, as explained earlier in reference to the third embodiment, is described.

Figure 5:
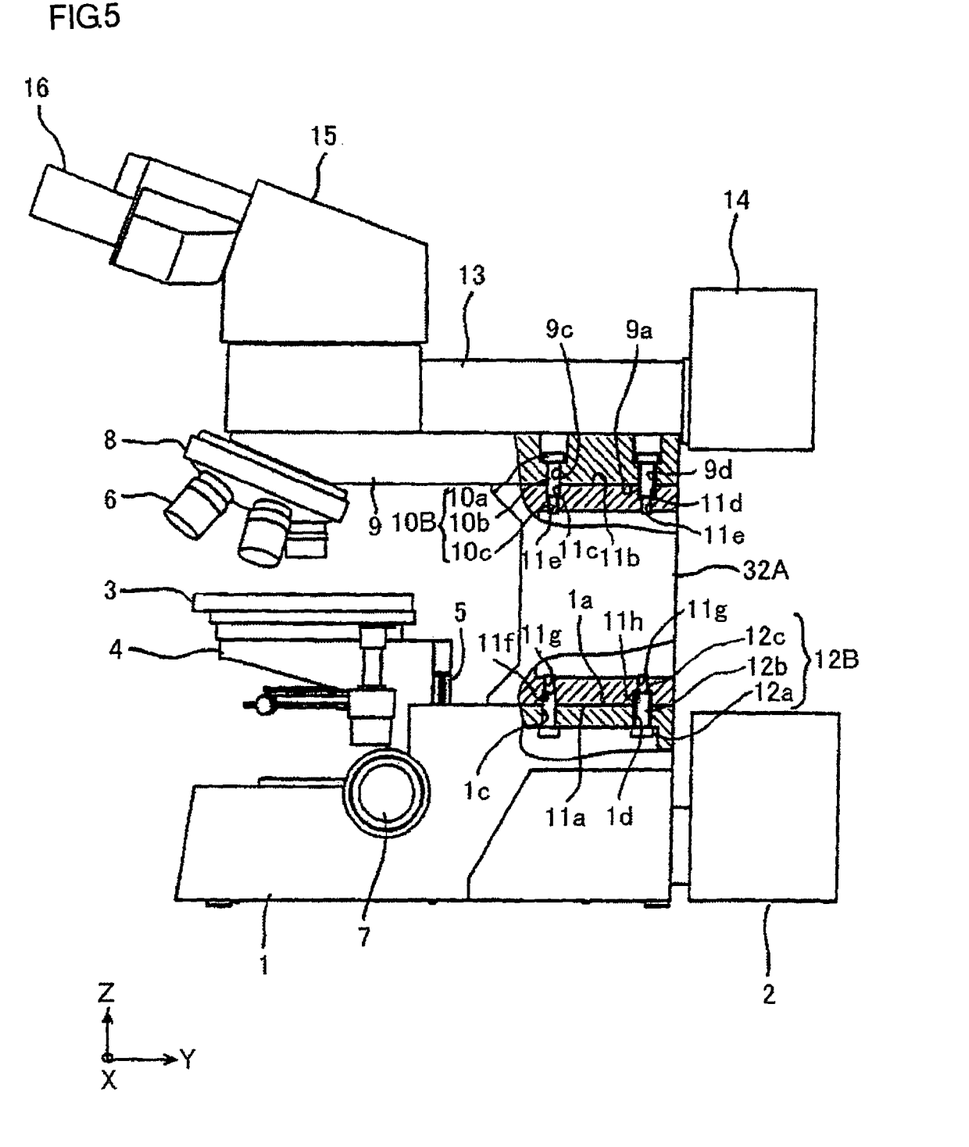
FIG. 5 shows a fourth embodiment of the microscope system according to the present invention.

FIG. 5 shows the fourth embodiment of the microscope system according to the present invention in a partial sectional view taken from a side of the microscope system. The microscope in FIG. 5 is configured by combining the base unit 101, the stand unit 203 and the eyepiece unit 300 minus the AF unit 23 in FIG. 4. It is to be noted that the arm stand unit 32 in the stand unit 203 is constituted with separate portions, i.e., an arm portion 9 and a stand unit 32A. Thus, the stand unit 32A, too, can be regarded as an independent unit. It is to be noted that the same reference numerals are assigned to components similar to those of the microscope systems in the first through third embodiments to preclude the necessity for a detailed explanation of the individual components.

The following is an explanation of how the base unit 1 and the stand unit 32A may be connected to each other and how the stand unit 32A and the arm portion 9 may be connected to each other in the microscope system.

Figure 6:
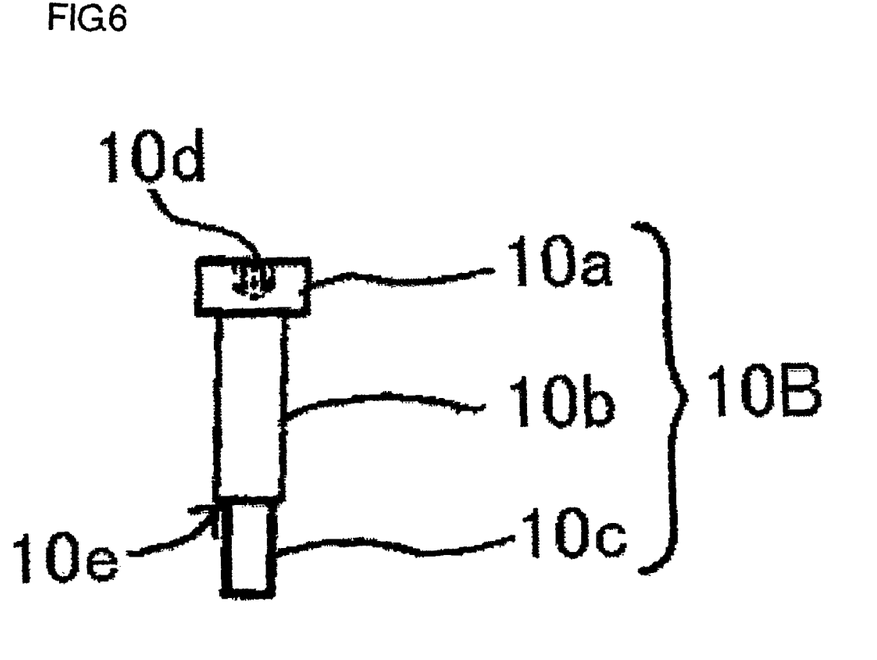
FIG. 6 shows a side elevation of a bolt.
Figure 7:
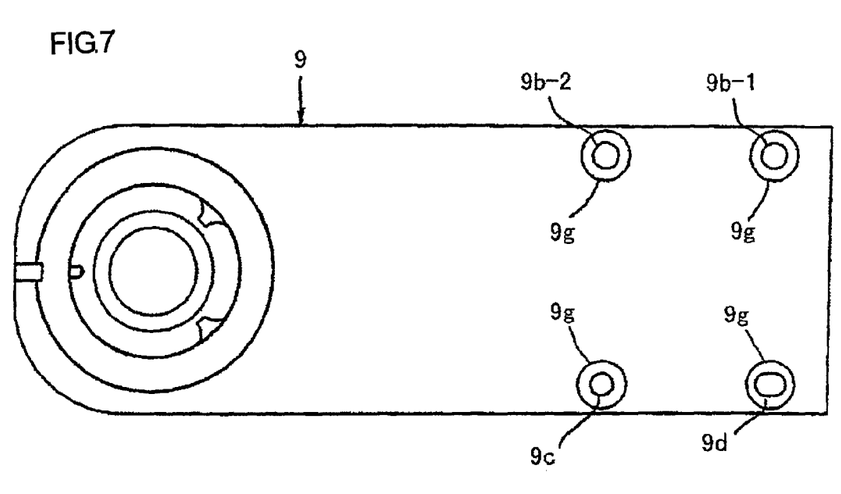
FIG. 7 is a top view of an arm portion.
Figure 8:
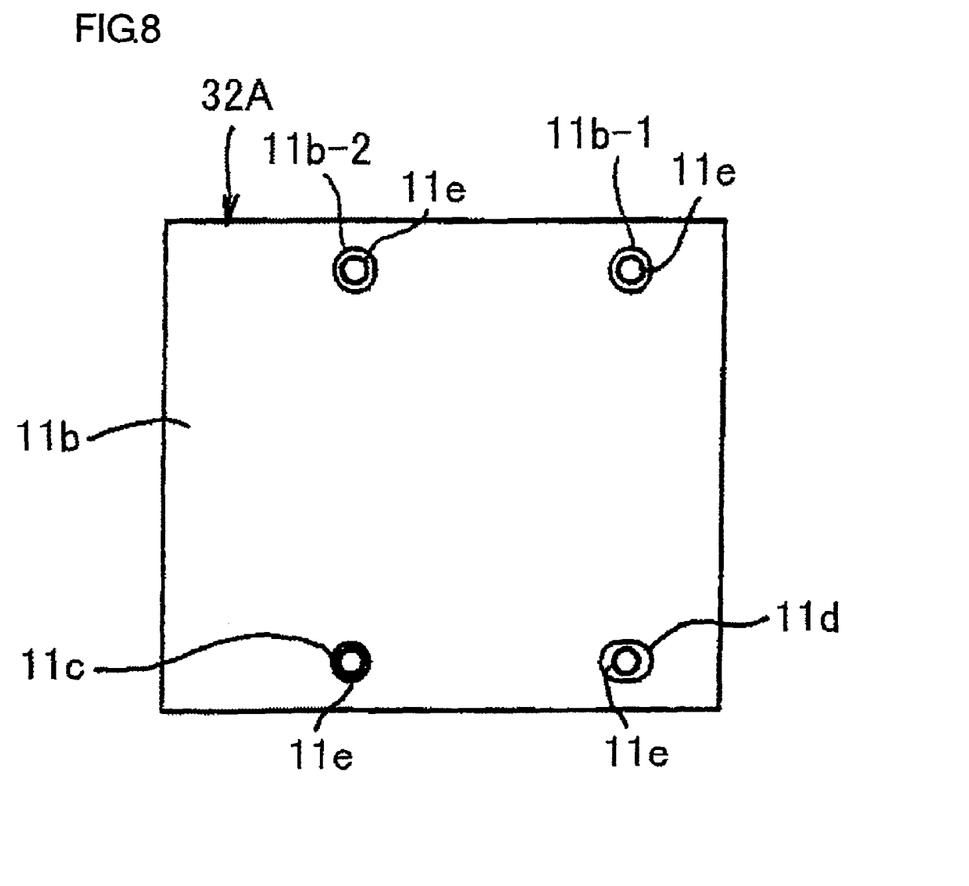
FIG. 8 is a top view of a stand unit.

As shown in FIG. 5, the base unit 1 and the stand unit 32 are fixed to each other and the stand unit 32A and the arm portion 9 are fixed to each other respectively via a plurality of bolts 12B and a plurality of bolts 10B. FIG. 6 is a side elevation of a bolt 10B used to connect the arm portion 9 to the stand unit 32A. FIG. 7 presents a top view of the arm portion 9 and FIG. 8 presents a top view of the stand unit 32A.

As shown in FIG. 6, the bolt 10B is a staged bolt that includes a head portion 10a and a shaft portion constituted with a cylindrical portion 10b and a male threaded portion 10c. A hexagonal hole 10d at which a hexagonal wrench can be inserted is formed at the head portion 10a. The cylindrical portion 10b, which is the part of the shaft portion with no screw thread, functions as a positioning pin when the arm portion 9 and the stand unit 32A are linked to each other. The outer diameter of the cylindrical portion 10b is greater than the outer diameter of the male threaded portion 10c and thus, a stage is formed at the shaft portion. The area over which this stage is formed is referred to as a bottom surface 10e of the cylindrical portion 10b.

Four bolt passing holes 9b-1, 9b-2, 9c and 9d are formed at the arm portion 9. It is to be noted that above each of the holes 9b-1, 9b-2, 9c and 9d (along the Z axis), a guide hole 9g through which the head portion 10a of the corresponding bolt 10B is to pass, is formed. In order to ensure that the cylindrical portions 10b of the bolts 10B are inserted with ease, the holes 9b-1 and 9b-2 are formed to have an inner diameter considerably larger than the outer diameter of the cylindrical portions 10b. These holes 9b-1 and 9b-2 are referred to as bolt holes.

The hole 9c is a fitting hole used to position the arm portion 9 and the stand unit 32A relative to each other. It is formed to have an inner diameter slightly larger than the outer diameter of the cylindrical portions 10 b so that the cylindrical portion 10b of the corresponding bolt 10B can be fitted therein with substantially no clearance. Namely, the fitting hole 9c is designed so as to have an inner diameter smaller than the inner diameter of the bolt holes 9b-1 and 9b-2. The hole 9d is an elongated hole, with its breadth measured along a minor axis (up/down direction in FIG. 7, the direction extending along the X axis) set slightly larger than the outer diameter of the cylindrical portions 10b of the bolts 10B and its length measured along the major axis (left-right direction in FIG. 7, the direction extending along the Y axis) set considerably larger than the outer diameter of the cylindrical portions 10b. It is desirable that the length measured along the major axis of the elongated hole 9d be smaller than the outer diameter of the head portions 10a of the bolts 10B.

As shown in FIG. 8, four bolt passing holes 11b-1, 11b-2, 11c and 11d are formed at an upper surface 11b of the stand unit 32A at positions corresponding to those of the bolt holes 9b-1 and 9b-2, the fitting hole 9c and the elongated hole 9d. In order to ensure that the cylindrical portions 10b of the bolts 10B are inserted with ease, the bolt holes 11b-1 and 11b-2 are formed to have an inner diameter considerably larger than the outer diameter of the cylindrical portions 10b. The fitting hole 11c is used to position the arm portion 9 and the stand unit 32A relative to each other and is formed to have an inner diameter slightly greater than the outer diameter of the cylindrical portion 10b so that the cylindrical portions 10b of the corresponding bolt 10B can be fitted therein with substantially no clearance. Namely, the fitting hole 11c is designed so as to have an inner diameter smaller than the inner diameter of the bolt holes 11b-1 and 11b-2. The elongated hole 11d is designed to a breadth measured along the minor axis (up/down direction in FIG. 8, the direction extending along the X axis) set slightly larger than the outer diameter of the cylindrical portions 10b of the bolts 10B and a length measured along the major axis (left-right direction in FIG. 8, the direction extending along the Y axis) set considerably larger than the outer diameter of the cylindrical portions 10b.

It is desirable that the inner diameter of the bolt holes 11b-1 and 11b-2, the inner diameter of the fitting hole 11c and the inner diameter of the elongated hole 11d respectively be substantially equal to the inner diameters of the bolt holes 9b-1 and 9b-2, the fitting hole 9c and the elongated hole 9d formed at the arm portion 9.

Under the bolt holes 11b-1 and 11b-2, the fitting hole 11c and the elongated hole 11d (along the −Z axis), female threaded portions 11e to interlock with the male threaded portions 10c of the bolts 10B are formed. At each of the bolt holes 11b-1 and 11b-2, the fitting hole 11c and the elongated hole 11d, the corresponding female threaded portion 11e is formed axially with the hole. It is to be noted that the inner diameter of the female threaded portions 11e is smaller than the inner diameters of the bolt holes 11b-1 and 11b-2, the fitting hole 11c and the elongated hole 11d. As a result, a bottom surface corresponding to the bottom surface 10e of the cylindrical portion 10b at the bolt 10B is formed at each of the holes 11b-1 and 11b-2, 11c and 11d.

As the male threaded portions 10c of the bolts 10B are made to interlock with the female threaded portions 11e at the stand unit 32A, the bottom surfaces of the head portions 10a of the bolts 10B come into contact with the bottom surfaces of the guide holes 9g formed at the arm portion 9. As a result, a contact surface (connecting surface) 9a of the arm portion 9 and a contact surface (connecting surface) 11b of the stand unit 32A are pressed against each other, as shown in FIG. 5, thereby linking the arm portion 9 and the stand unit 32A to each other. The depth of the bolt holes 11b-1 and 11b-2, the fitting hole 11c and the elongated hole 11d at the stand unit 32A are set so as to generate a sufficient level of fastening force between the arm portion 9 and the stand unit 32A at this time. Namely, if the bottom surfaces 10e of the cylindrical portions 10b of the bolts 10B come in contact with the bottom surfaces of the holes 11b-1 and 11b-2, 11c and 11d as the male threaded portions 10c and the female threaded portions 11e are made to interlock with each other, a sufficient level of fastening force cannot be achieved. Accordingly, the depth of the holes needs to be set so that as the contact surface 9a and the contact surface 11b of the stand unit 32A become pressed against each other, a slight clearance is formed between the bottom surfaces 10e of the cylindrical portions 10b of the bolts 10B and the bottom surfaces of the individual holes 11b-1 and 11b-2, 11c and 11d.

The following is an explanation of the procedure through which the arm portion 9 and the stand unit 32A are attached to each other. After aligning the fitting hole 9c at the arm portion 9 with the fitting hole 11c at the stand unit 32A, a bolt 10B is inserted. Next, the elongated hole 9d and the elongated hole 11d are aligned and a bolt 10B is inserted. Thus, the arm portion 9 can no longer move relative to the stand unit 32A over the X-Y plane, which makes it possible to accurately position the arm portion 9 relative to the stand unit 32A. After the arm portion is positioned relative to the stand unit, a hexagonal wrench (not shown) is used to screw the male threaded portions 10c of the bolts 10B into the female threaded portions 11e at the fitting hole 11e and the elongated hole 11d.

Then, a bolt 10B is inserted through the bolt holes 9b-1 and 11b-1 facing opposite each other and the male threaded portion 10c of the bolt 10B is screwed into the female threaded portion 11e with the hexagonal wrench. In addition, a bolt 10B is inserted through the bolt holes 9b-2 and 11b-2 facing opposite each other and the male threaded portion 10c of the bolt 10B is screwed into the female threaded portion 11e with the hexagonal wrench. As a result, the arm portion 9 and the stand unit 32A become attached to each other with the position of the arm portion 9 relative to the stand unit 32A set accurately.

The base unit 1 and the stand unit 32A are connected to each other through a method similar to that with which the arm portion 9 and the stand unit 32A are connected to each other as described above. Accordingly, a fitting hole 11f and an elongated hole 11h with functions respectively similar to those of the fitting hole 11c and the elongated hole 11d described earlier and two bolt holes (not shown) with a function similar to that of the bolt holes 11b-1 and 11b-2 are formed at a surface 11a of the stand unit 32A to come in contact with the base unit 1, as shown in FIG. 5. Above each hole (along the Z axis), a female threaded portion 11g to interlock with a male threaded portion 12c of a bolt 12B is formed. A fitting hole 1c and an elongated hole 1b with functions similar to those of the fitting hole 9c and the elongated hole 9d respectively and two bolt holes (not shown) with a function similar to that of the bolt holes 9b-1 and 9b-2 are formed at a surface 1a of the base unit 1 to come into contact with the stand unit 32A.

As are the bolts 10B, the bolts 12B each include a head portion 12a, a cylindrical portion 12b and the male threaded portion 12c.

As the male threaded portions 12c of the bolts 12B are made to interlock with the female threaded portions 11g at the stand unit 32A, the bottom surfaces of the head portions 12a of the bolts 12B come into contact with the inner surface of the base unit 1. As a result, the contact surface 1a of the base unit 1 and the contact surface 11a of the stand unit 32A are pressed against each other, thereby linking the base unit 1 and the stand unit 32A to each other. The depth of the fitting hole 11f and the elongated hole 11h at the stand unit 32A is set so as to generate a sufficient level of fastening force between the base unit 1 and the stand unit 32A at this time. Namely, if the bottom surfaces (correspond to the bottom surface 10e of the bolts 10B) of the cylindrical portions 12b of the bolts 12B come in contact with the bottom surfaces of the holes 11f and 11h as the male threaded portions 12c and the female threaded portions 11g are made to interlock with each other, a sufficient level of fastening force cannot be achieved. Accordingly, the depth of the holes needs to be set so that as the contact surface 1a and the contact surface 11a of the stand unit 32A become pressed against each other, a slight clearance is formed between the bottom surfaces of the cylindrical portions 12b of the bolts 12B and the bottom surfaces of the individual holes 11f and 11h. The depth of the bolt holes (not shown), too, is selected by taking these factors into consideration.

By adopting the structures described above in the base unit 1 and the stand unit 32A, the base unit 1 and the stand unit 32A can be attached to each other with their positions relative to each other set accurately, in a similar manner with which the arm portion 9 and the stand unit 32A are attached to each other accurately as explained earlier.

It is to be noted that when four bolts 10B and four bolts 12B are used as explained above, different types of bolts should be used for the bolts 10B for attaching the arm portion 9 and the stand unit 32 to each other and the bolts 12B for attaching the base unit 1 and the stand unit 32A to each other as the levels of the required fastening forces are different. Alternatively, a single type of bolt may be used as the bolts 10B and the bolts 12B in different quantities so as to achieve the different levels of required fastening force in attaching the arm portion 9 and the stand unit 32A to each other and attaching the base unit 1 and the stand unit 32A to each other. It is also to be noted that at least fitting holes and elongated holes need to be formed to attach two units to each other with at least two bolts, in order to ensure that the two units are attached with their positions relative to each other set accurately.

Fifth Embodiment

The following is an explanation of the fifth embodiment of the present invention.

Figure 9:
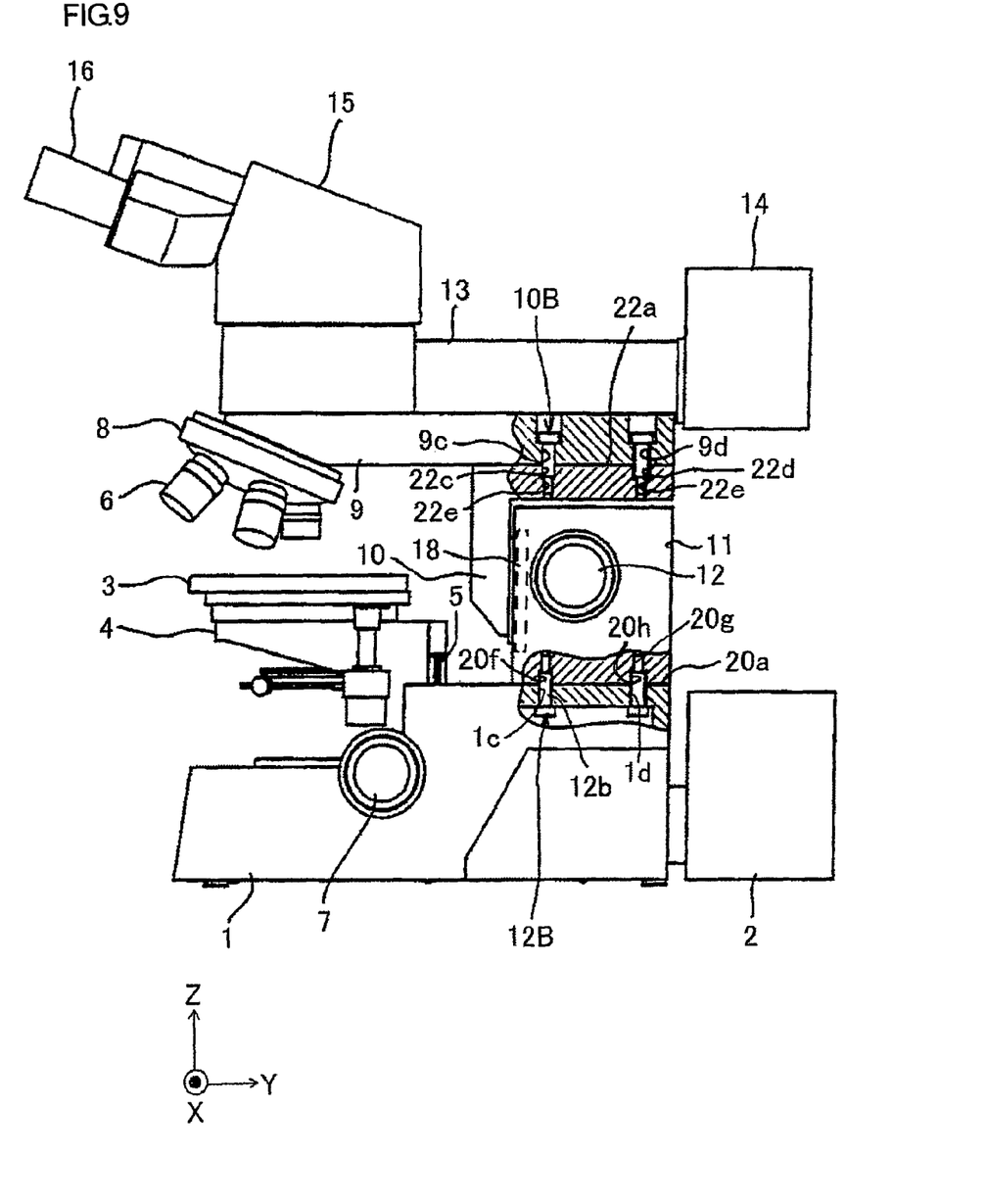
FIG. 9 shows a fifth embodiment of the microscope system according to the present invention.

FIG. 9 shows the fifth embodiment of the microscope system according to the present invention in a partial sectional view taken from a side of the microscope system. The microscope in FIG. 9, configured by combining the base unit 101, the stand unit 201 and the eyepiece unit 300 minus the AF unit 23 in FIG. 4, is similar to the microscope system achieved in the first embodiment. The stand unit 11 of the stand unit 201 can be detachably mounted at the bracket portion 10 via the second Z drive mechanism 18, and the arm portion 9 and the bracket portion 10 can be detached from each other. In other words, the stand unit 11 and the bracket portion, too, can be considered to constitute independent units. It is to be noted that the same reference numerals are assigned to components similar to those of the microscope systems in the first through fourth embodiment to preclude the necessity for a detailed explanation of the individual components.

The following is an explanation of how the base unit 1 and the stand unit 11 may be connected to each other and how the bracket portion 10 and the arm portion 9 may be connected to each other in the microscope system. As shown in FIG. 9, the base unit 1 and the stand unit 11 are fixed to each other and the bracket portion 10 and the arm portion 9 are fixed to each other respectively via a plurality of bolts 12B and a plurality of bolts 10B.

A fitting hole 20f and an elongated hole 20h equivalent to the fitting hole 11f and the elongated hole 11h described earlier and two bolt holes (not shown) are formed at a surface 20a of the stand unit 11 to come in contact with the base unit 1, as shown in FIG. 9. Above each hole (along the Z axis), a female threaded portion 20g to interlock with a male threaded portion 12c of a bolt 12B is formed. The base unit 1 and the stand unit 11 are attached to each other by inserting a bolt 12B through the fitting hole 1c formed at the base unit 1 and the fitting hole 20f formed at the stand unit 11, which have been aligned with each other and inserting a bolt 12B through the elongated hole 1d and the elongated hole 20h having been aligned with each other. As a result, the base unit 1 and the stand unit 11 become positioned relative to each other accurately. Subsequently, the male threaded portions 12c of the bolts 12B are interlocked with the female threaded portions 20g at the stand unit 11, thereby attaching the base unit 1 and the stand unit 11 to each other. Then, bolts 12B are inserted through the two sets of bolt holes and the male threaded portions 12c interlock at the corresponding female threaded portions 20g.

A fitting hole 22c and an elongated hole 22d equivalent to the fitting hole 11c and the elongated hole 11d described earlier and two bolt holes (not shown) are formed at an upper surface 22a of the bracket portion 11 to come in contact with the arm portion 9. Below each hole (along the −Z axis), a female threaded portion 22e to interlock with a male threaded portion 10c of a bolt 10B is formed. The bracket portion 10 and the arm portion 9 are attached to each other by inserting a bolt 10B through the fitting hole 9c formed at the arm portion 9 and the fitting hole 22c formed at the bracket portion 10, which have been aligned with each other and inserting a bolt 10B through the elongated hole 9d and the elongated hole 22d having been aligned with each other. As a result, the bracket portion 10 and the arm portion 9 become positioned relative to each other accurately. Subsequently, the male threaded portions 10c of the bolts 10B are interlocked with the female threaded portions 22e at the bracket portion 10, thereby attaching the bracket portion 10 and the arm portion 9 to each other. Then, bolts 10B are inserted through the two sets of bolt holes and the male threaded portions 10c interlock at the corresponding female threaded portions 22e.

Sixth Embodiment

The following is an explanation of the sixth embodiment of the present invention.

Figure 10:
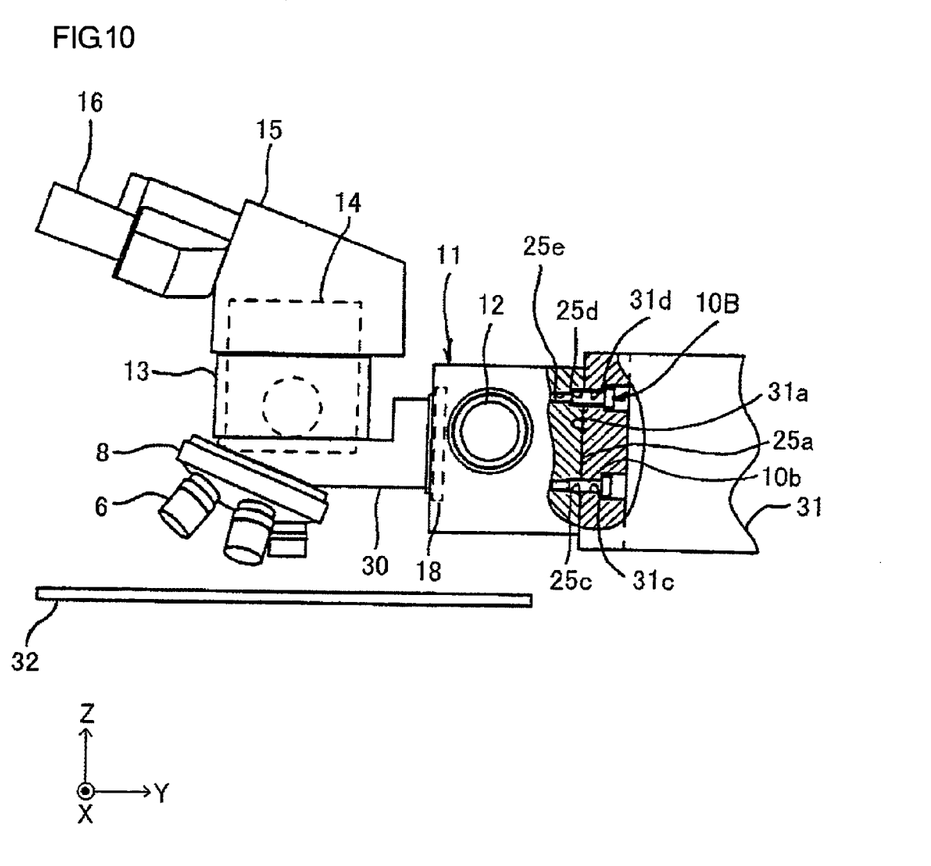
FIG. 10 shows an observation apparatus achieved in a sixth embodiment of the present invention.

FIG. 10 shows the sixth embodiment of the present invention. An observation apparatus configured by attaching an eyepiece unit and a stand unit as shown in FIG. 10, illustrating the sixth embodiment, is utilized to observe a large specimen 32. In the observation apparatus the stand unit 11 of the stand unit is mounted at an L-shaped bracket 30 via the second Z drive mechanism 18 so as to be allowed to move along the Z axis and the stand unit 11 is also attached to a transfer device 31 that is engaged in transfer of the specimen 32. In FIG. 10, the same reference numerals are assigned to components similar to those of the microscope systems achieved in the first through fifth embodiments and their detailed explanation is omitted.

The microscope system in the fifth embodiment described earlier is configured by attaching the stand unit 11 and the base unit 1 to each other. The observation apparatus in the sixth embodiment is configured by attaching the stand unit 11 and the transfer device 31 to each other. In order to allow the single type of stand unit 11 to be used to realize various apparatus configuration, bolt passing holes are formed at a plurality of surfaces of the stand unit 11.

Figure 11:
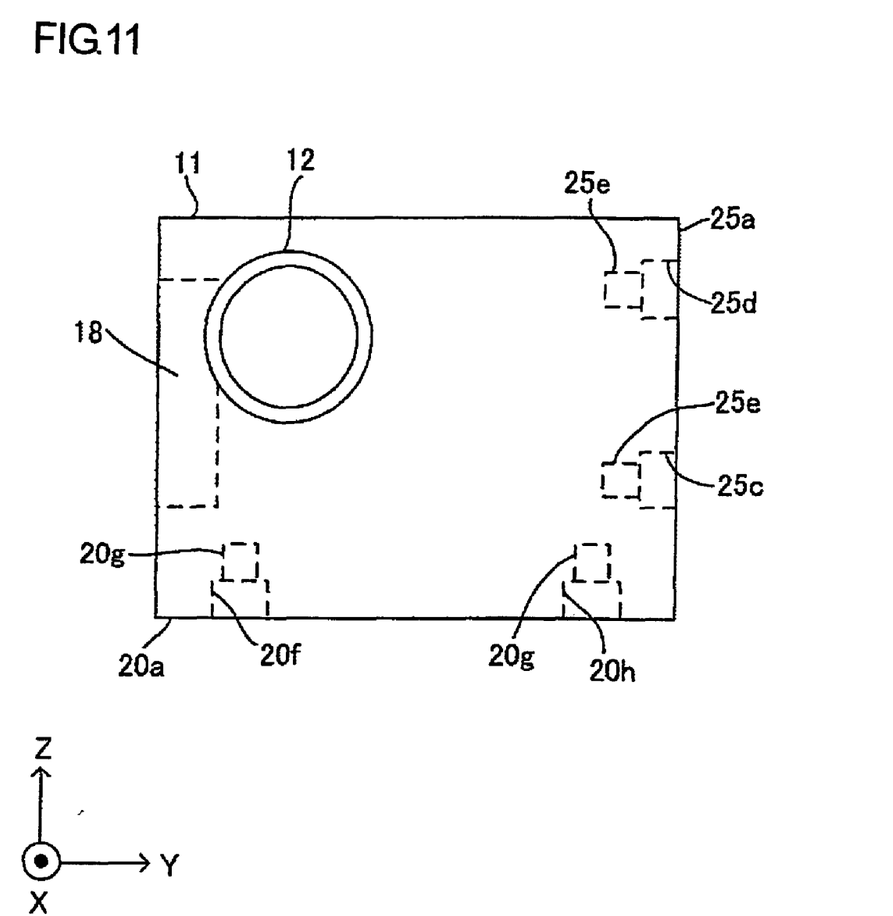
FIG. 11 shows the bolt passing holes formed at the stand unit.

More specifically, a fitting hole 20f, an elongated hole 20h and two bolt holes (not shown) are formed at a surface 20a, as shown in FIG. 11. Above each hole (along the Z axis), a female threaded portion 20g to interlock with a male threaded portion 12c of a bolt 12B is formed. In addition, a fitting hole 25c, an elongated hole 25d and two bolt holes (not shown) are formed at another surface 25a of the stand unit 11. To the left (along the −Y axis) of each hole, a female threaded portion 25e to interlock with the male threaded portion 10c of a bolt 10B is formed.

In the sixth embodiment, the stand unit 11 and the transfer device 31 are attached to each other through the fitting hole 25c, the elongated hole 25d and the bolt holes formed at the surface 25a of the stand unit 11. Accordingly, a fitting hole 31c, an elongated hole 31d and two bolt holes are formed as shown in FIG. 10 at a surface 31a of the transfer device 31 at positions corresponding to the positions of the fitting hole 25c, the elongated hole 25d and the bolt holes.

The stand unit 11 and the transfer device 31 are attached to each other by inserting a bolt 10B through the fitting hole 31c formed at the transfer device 31 and the fitting hole 25c formed at the stand unit 11, which have been aligned with each other and inserting a bolt 10B through the elongated hole 31d and the elongated hole 25d having been aligned with each other. Thus, the stand unit 11 and the transfer device 31 become positioned relative to each other accurately. Then, the male threaded portions 10c of the bolts 10B are interlocked with the female threaded portions 25e at the stand unit 11, so as to attach the stand unit 11 to the transfer device 31. In addition, bolts 10B are inserted through the two sets of bolt holes and the male threaded portions 10c of the bolts 10B interlock with the female threaded portions 25e.

By forming a plurality of bolt passing holes at each of the plurality of surfaces 20a and 25a of the stand unit 11 as described above, various types of observation apparatuses to be utilized for specimen observation and various types of inspection apparatuses, such as the microscope system shown in FIG. 9 and the observation apparatus shown in FIG. 10 can be assembled with ease. In addition, through the fitting holes, the elongated holes and the bolt holes formed as described above, a plurality of units can be positioned relative to one another and fixed onto one another with a high degree of reliability.

It is to be noted that by forming a plurality of bolt passing holes, similar to those formed at the surfaces of the stand unit 11, at each of a plurality of surfaces of the stand unit 32A shown in FIG. 5 or the electrically driven stand unit 21 of the stand unit 202 shown in FIG. 4, the stand unit 32A or the electrically driven stand unit 21, too, can be mounted at a device other than the base unit 100, e.g., the transfer device 31.

While the invention has been particularly shown and described with respect to embodiments and variations thereof by referring to the attached drawings, the present invention is not limited to these examples and it will be understood by those skilled in the art that various changes in form and detail may be made therein without departing from the spirit, scope and teaching of the invention.

The disclosures of the following priority applications are herein incorporated by reference:

Japanese Patent Application No. 2004-296042 filed Oct. 8, 2004

Japanese Patent Application No. 2004-370929 filed Dec. 22, 2004

The invention claimed is:

1. A unit-type microscope system, comprising:
a stand unit that comprises a nosepiece that holds a plurality of objective lenses achieving different magnifying powers, a first drive device equipped with a first drive mechanism for moving the nosepiece up/down along an optical axis of the objective lens and a first operation device that adjusts focus on a specimen by operating the first drive device; and
a base unit that comprises a stage device on which the specimen is placed, a second drive device equipped with a second drive mechanism for moving the stage device up/down along the optical axis of the objective lens, a second operation device that adjusts the focus on the specimen by operating the second drive device and a lamp used to illuminate the specimen through transmitted illumination, wherein:
the stand unit further comprises a first connecting surface configured for connecting the stand unit to the base unit and a second connecting surface configured for connecting the stand unit to a device other than the base unit when the stand unit is removed from the base unit;
wherein in a first configuration achieved by connecting the stand unit to the base unit via the first connecting surface of the stand unit, a displacement range over which the objective lens is capable of moving up/down by the first drive device and a displacement range over which the stage device is capable of moving up/down by the second drive device are different from each other;
and, in the first configuration, the focus can be adjusted on the specimen via either one of the first operation device and the second operation device alone; and
wherein, in a second configuration achieved by connecting the stand unit to the device other than the base unit via the second connecting surface of the stand unit, the focus is adjusted on the specimen via the first operation device.

2. A unit-type microscope system, comprising:
a nosepiece that holds a plurality of objective lenses;
one of a first stand unit that comprises a first drive device equipped with a first drive mechanism for moving the nosepiece up/down along an optical axis of an objective lens, and a second stand unit to which the nosepiece is fixed; and
a base unit that comprises a stage device on which a specimen is placed and a second drive device equipped with a second drive mechanism for moving the stage device up/down along the optical axis of the objective lens, wherein:
a connecting surface at which one of either the first stand unit and the second stand unit is mounted is formed at the base unit;
wherein, a microscope assembled by using the base unit and the first stand unit and a microscope assembled by using the base unit and the second stand unit are different from each other;

wherein, one of the first stand unit or the second stand unit has a first connecting surface to connect with the base unit and a second connecting surface to connect with a device other than the base unit so that the one of the first stand unit and the second stand unit having the first connecting surface and the second connecting surface is configured to be removed from the base unit when connected with the device other than the base unit; and wherein, a displacement range over which the objective lens is made to move up/down by the first drive device in the microscope assembled by using the base unit and the first stand unit and a displacement range over which the stage device is made to move up/down by the second drive device in the microscope assembled by using the base unit and the second stand unit are different from each other.

3. A unit-type microscope system according to claim 2, further comprising:
an autofocus device that outputs a signal to be used when executing autofocus on the specimen; and
a control device that controls a drive of an electric motor, wherein:
the electric motor, the drive of which is controlled by the control device, is included in at least one of the first drive device and the second drive device; and
in addition to autofocus control under which the autofocus is executed by controlling the electric motor to rotate and stop based upon the signal provided by the autofocus device, the control device executes electric motor control under which the electric motor is controlled to rotate and stop in response to external operations.

4. A unit-type microscope system according to claim 2, wherein:
a manual stand unit equipped with a manually-operated first drive device, and an electrically driven stand unit, equipped with an electrically-operated first drive device, are each provided as the first stand unit in the microscope assembled by using the base unit and the first stand unit.

5. A unit-type microscope system according to claim 4, wherein:
one of the first stand unit and the second stand unit has a first connecting surface to connect with the base unit and a second connecting surface designed to connect with a device other than the base unit.

6. A unit-type microscope system according to claim 4, wherein:
a plurality of screw holes and a plurality of first bolt passing holes each communicating with one of the plurality of screw holes are formed at the base unit;
a plurality of second bolt passing holes are formed at one of the first stand unit and the second stand unit at positions corresponding to positions of the plurality of first bolt passing holes;
shafts of bolts used to connect the base unit with one of the first stand unit and the second stand unit are inserted through the plurality of second bolt passing holes and the plurality of first bolt passing holes and threaded portions of the bolts are interlocked with the plurality of screw holes;
an inner diameter of the plurality of first bolt passing holes and an inner diameter of the plurality of second bolt passing holes formed at the positions corresponding to the positions of the plurality of first bolt passing holes are substantially equal to each other; and
an inner diameter of a first fitting hole among the plurality of first bolt passing holes and an inner diameter of a second fitting hole among the plurality of second bolt passing holes, formed at a position corresponding to a position of the first fitting hole, are designed to be slightly larger than an outer diameter of the shafts of the bolts.

7. A unit-type microscope system according to claim 2, wherein:
a plurality of screw holes and a plurality of first bolt passing holes each communicating with one of the plurality of screw holes are formed at the base unit;
a plurality of second bolt passing holes are formed at one of the first stand unit and the second stand unit at positions corresponding to positions of the plurality of first bolt passing holes;
shafts of bolts used to connect the base unit with one of the first stand unit and the second stand unit are inserted through the plurality of second bolt passing holes and the plurality of first bolt passing holes and threaded portions of the bolts are interlocked with the plurality of screw holes;
an inner diameter of the plurality of first bolt passing holes and an inner diameter of the plurality of second bolt passing holes formed at the positions corresponding to the positions of the plurality of first bolt passing holes are substantially equal to each other; and
an inner diameter of a first fitting hole among the plurality of first bolt passing holes and an inner diameter of a second fitting hole among the plurality of second bolt passing holes, formed at a position corresponding to a position of the first fitting hole, are slightly larger than an outer diameter of the shafts of the bolts.

8. A unit-type microscope system according to claim 7, wherein:
a hole other than the first fitting hole among the plurality of first bolt passing holes is an elongated hole and a hole corresponding to the elongated hole among the plurality of second bolt passing holes is also an elongated hole.

* * * * *